UNITED STATES PATENT OFFICE.

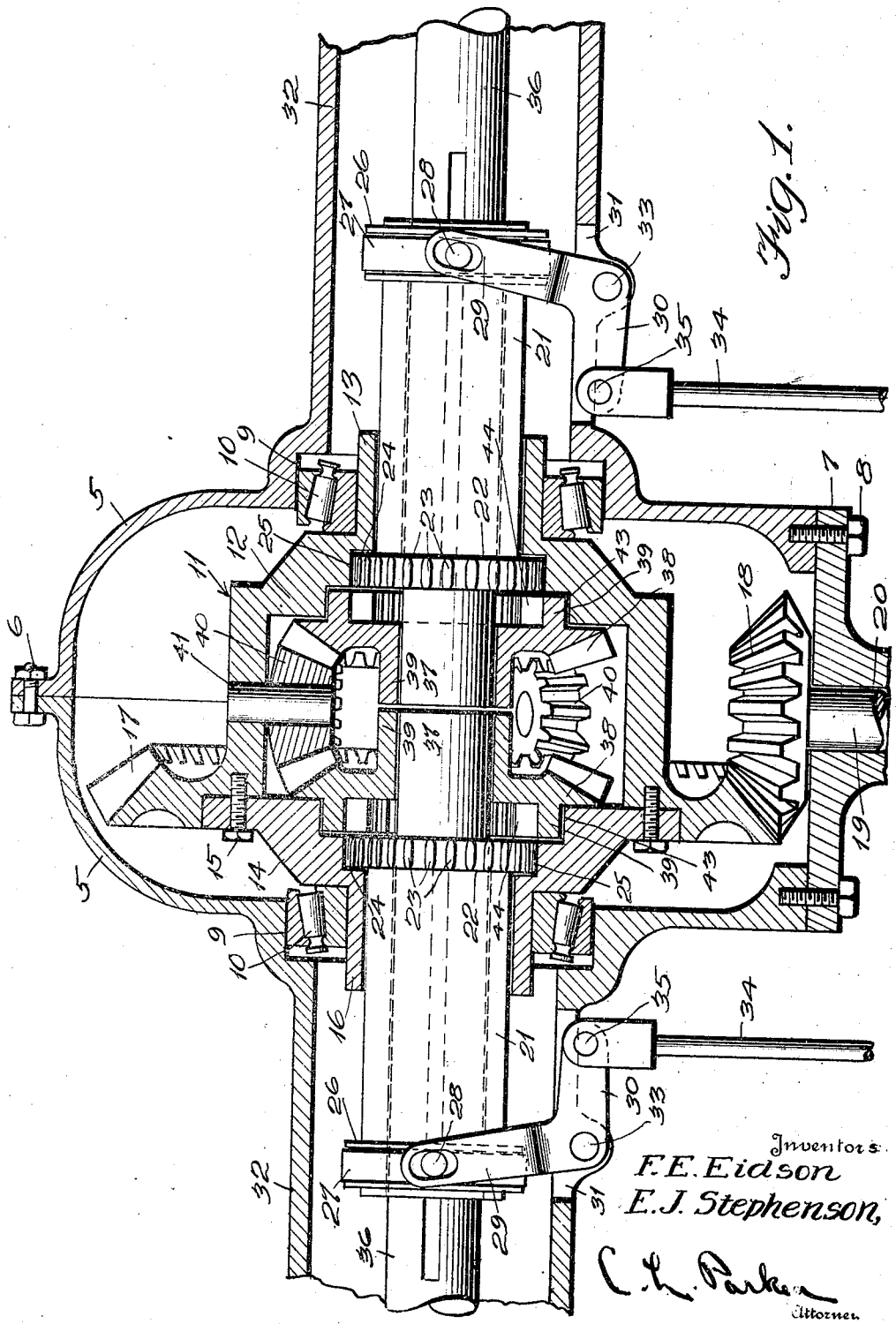

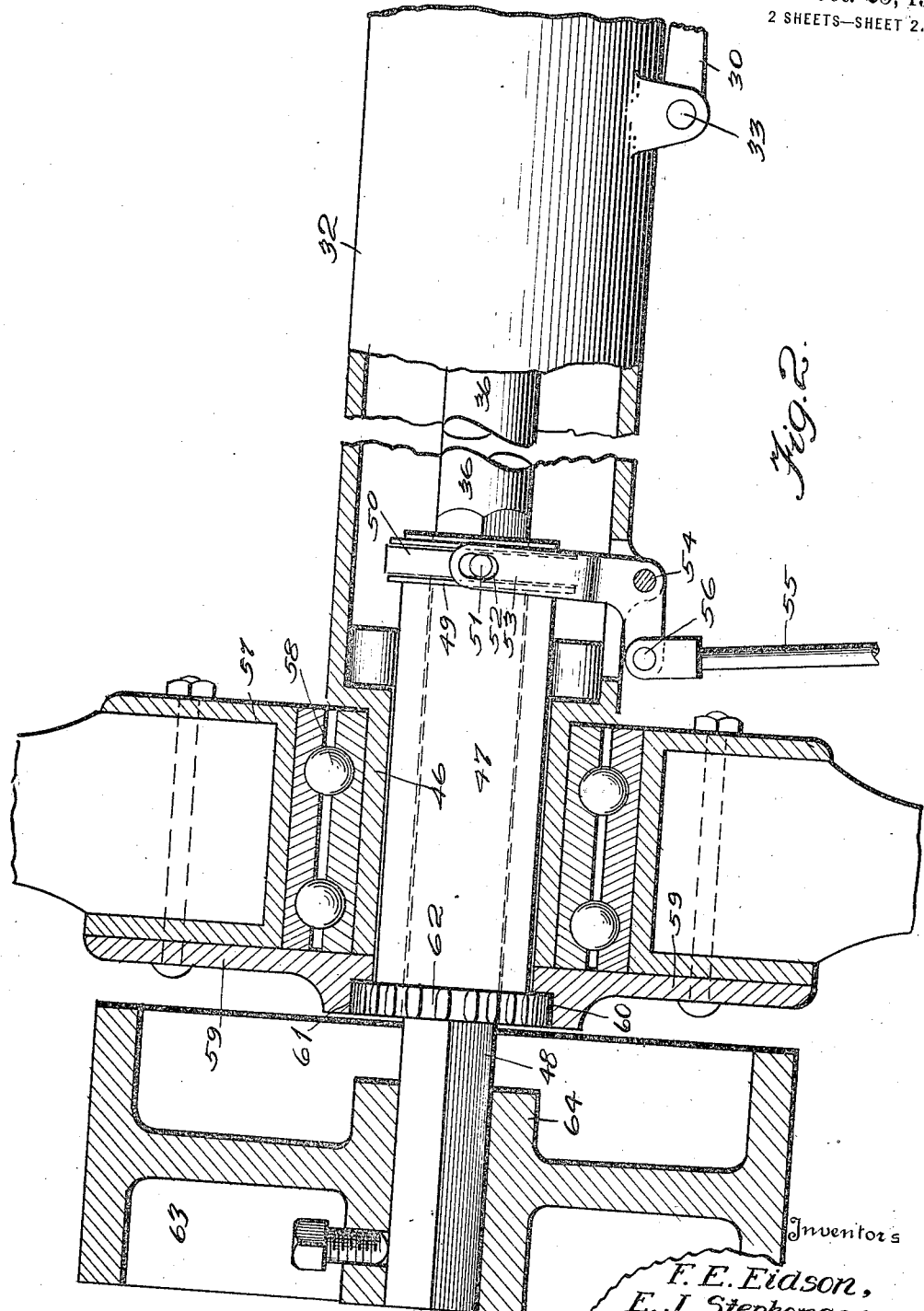

FREDDIE E. EIDSON AND EARL J. STEPHENSON, OF MOSCOW, KANSAS.

DIFFERENTIAL GEARING.

1,243,720.   Specification of Letters Patent.   Patented Oct. 23, 1917.

Application filed May 12, 1917. Serial No. 168,243.

*To all whom it may concern:*

Be it known that we, FREDDIE E. EIDSON and EARL J. STEPHENSON, citizens of the United States, residing at Moscow, in the county of Stevens and State of Kansas, have invented certain new and useful Improvements in Differential Gearing, of which the following is a specification.

Our invention relates to improvements in differential gearing, adapted for use in connection with automobiles or the like, while not necessarily restricted to this use.

An important object of the invention is to provide means for directly connecting or locking either or both axle sections of the differential gearing, with the planetary gear carrier or casing.

A further object of the invention is to provide means whereby a pulley or the like may be driven by either or both axle sections, without removing the wheel or wheels of the truck, tractor, or like apparatus, having the improved differential gearing applied thereto.

A further object of the invention is to provide a device of the above mentioned character, which is convenient to actuate, and reliable in operation.

Other objects and advantages of the invention will be apparent during the course of the following description.

In the accompanying drawings forming a part of this specification and in which like numerals are employed to designate like parts throughout the same, Figure 1 is a central horizontal sectional view through apparatus embodying our invention, parts being broken away, and, Fig. 2 is a similar view of the outer end of one axle section and associated elements, parts being shown in elevation.

In the drawings, wherein for the purpose of illustration is shown a preferred embodiment of our invention, the numeral 5 designates sections of a differential gear casing, which are bolted or otherwise rigidly connected, as shown at 6. The rear end of this casing is closed and its forward end is covered by a plate or head 7, attached thereto by bolts 8, as shown.

The casing sections 5 are provided with annular recesses 9, receiving roller bearings 10, of any well known or preferred construction. The numeral 11 designates a planetary gear carrier or casing, arranged for rotation within the differential casing, and having one end thereof closed by a head 12. This head is provided with a sleeve 13, preferably formed integral therewith, and arranged within one roller bearing 10, as shown. The opposite end of the planetary gear carrier or casing 11 is closed by a head 14, attached thereto by means of bolts 15 or the like. The head 14 is provided with a sleeve 16, preferably formed integral therewith, and extending through the other roller bearing 10, as shown. It is thus apparent that the roller bearings 10 serve to rotatably support the planetary gear carrier or casing 13 within the planetary gear casing.

Preferably formed integral with the carrier or casing 11 is an outwardly extending beveled gear 17, engaged and driven by a bevel gear 18, rigidly connected with a driving shaft 19, journaled within an opening 20. The shaft 19 is connected with the crank shaft of the engine of an automobile or the like, to be driven thereby.

Rotatably and longitudinally movably mounted within the sleeves 13 and 16 are locking sleeves 21, provided at their inner ends with clutch elements 22, preferably in the form of gears, having their teeth 23 preferably tapered at their ends, to avoid stripping. The ends 12 and 14 of the differential gear carrier or casing 11 are provided with annular recesses 24, having their peripheries provided with gear teeth 25, adapted to coact or mesh with the teeth 23 of the gears 22. It is obvious that when either locking sleeve 21 is moved outwardly, so that the sets of gear teeth 23 and 25 intermesh, such locking sleeve is secured to the carrier or casing 11, for rotation therewith.

Each locking sleeve 21 is provided with a grooved annular flange 26, preferably formed integral therewith, pivotally receiving a ring 27, carrying trunnions 28, operating within elongated openings formed in the forked end 29 of a bell crank lever 30. This bell crank lever is arranged within an opening or slot 31 formed in a tubular extension 32 of the casing section 5, and is pivoted therein by a pin 33 or the like. The bell crank lever 30 is swung by a reach rod 34, pivoted thereto, as shown at 35. This reach rod may be operated by any suitable means.

The locking sleeves 21 are splined upon the inner portions of axle sections 36, which extend inwardly beyond the same to provide substantially contacting ends 37. It is to be understood that the portion of the axle section 36, upon which the sleeve 21 is mounted, may be formed square or other than round in cross-section and the bore of the sleeve 21 of the same shape in cross-section, and the term "splined" is intended to cover this construction.

The numeral 38 designates sun bevel gears, having hubs 39, which are rotatable upon the ends 37 of the axle sections 36, These bevel gears permanently engage planetary bevel gears 40, which are rotatably mounted upon stub shafts 41, secured to the carrier or casing 11, as shown. Each sun bevel gear 38 is provided upon its outer side with a clutch element, preferably in the form of an annular flange 42, adapted for operation within a recess 43. This flange is provided with an interior set of gear teeth 44, adapted to mesh with the gear teeth 33. It is thus apparent that when the locking sleeve 21 is moved inwardly sufficiently to bring the teeth 23 into mesh with the teeth 44, the sun bevel gear 38 will be locked to the axle section 36 for rotation therewith. The axle section 36 will therefore be driven directly with and by the carrier or casing 11, while the other elements of the planetary gearing, and the other axle section 36 will be idle.

As more clearly shown in Fig. 2, the tubular extension 32 is provided with a reduced cylindrical portion 46, within which is rotatably and longitudinally movably mounted a power distributing locking sleeve 47. This sleeve is arranged upon the outer portion 48 of the axle section 36, which is square in cross-section, the bore of the sleeve 47 being also square in cross-section, whereby the sleeve 47 is splined upon the outer portion 48. The sleeve 47 is provided with an annular flange or ring 49, preferably formed integral therewith, and provided with an annular groove for pivotally receiving a ring 50, carrying trunnions 51. These trunnions operate within elongated openings 52, formed in the forked end of a bell crank lever 53, pivoted at 54. This bell crank lever is swung by a reach rod 55, pivoted thereto as shown at 56.

The numeral 57 designates the hub of a wheel of a truck or other power driven vehicle. This hub is rotatable upon the cylindrical reduced portion 46 and a ball bearing 58 is preferably arranged between these parts, as shown.

A disk or plate 59 is bolted or otherwise rigidly secured to the hub 57 and is provided at its center with a clutch element 60, having a recess formed therein which is provided with gear teeth 61. These gear teeth are adapted to mesh with gear teeth 62, rigidly secured to the sleeve 47. When the sleeve 47 is in the inner position, as shown in Fig. 2, it is obvious that the hub 57 is locked to this sleeve for rotation therewith, but when the sleeve is moved outwardly so that these two sets of gear teeth disengage, the hub 57 will then be idle.

The numeral 63 designates a power distributing pulley, having a hub 64, rigidly secured to the end of the axle section 36, and spaced from the gear teeth 62, to allow of the outward movement of the sleeve 47. It is therefore apparent that the hub 57 may be rendered idle, and the same will serve to support the power distributing pulley 63, which may then be driven, as is obvious.

The operation of the apparatus is as follows:

When both sleeves 21 are in the innermost position, the gear teeth 23 intermesh with the gear teeth 44, whereby the sun bevel gears 38 are locked to the separate axle sections 36. The elements thus assembled constitute a differential gear, the operation of which is believed to be obvious. Should it be desired to drive either wheel directly from or by the carrier or casing 11, the corresponding sleeve 21 is moved outwardly, whereby this sleeve is unlocked from the sun bevel gear 38 and locked with the carrier or casing 11. The axle section 36 will now rotate with the carrier or casing 11 while the corresponding sun gear 38 is idle, which renders the other elements of the differential gearing idle, together with the other shaft section 36.

It is to be understood that the form of our invention herewith shown and described is to be taken as a preferred example of the same, and that various changes in the shape, size, and arrangements of parts may be resorted to without departing from the spirit of the invention or the scope of the subjoined claims.

Having thus described our invention, we claim:

1. A differential gearing of the character described, comprising a planetary gear casing having its opposite ends provided with clutch elements, planetary gears carried by the planetary gear casing, axle sections extending into the planetary gear casing, sun gears rotatably mounted upon the inner ends of the axle sections and provided with clutch elements and arranged to engage with the planetary gears, and locking elements splined upon the axle sections and provided with clutch elements for movement into and out of engagement with said first and second named clutch elements, and means to rotate the planetary gear casing.

2. A differential gearing of the character described, comprising a planetary gear casing having clutch elements carried by the interior of the ends thereof, planetary gears carried by the casing, axle sections extending into the planetary gear casing, sun gears rotatably mounted upon the inner ends of the axle sections and engaging the planetary gears and provided upon their outer sides with clutch elements, sleeves splined upon the axle sections and provided with clutch elements for movement into and out of engagement with said clutch first and second named elements, means to shift the sleeves, and means to rotate the planetary gear casing.

In testimony whereof we affix our signatures.

FREDDIE E. EIDSON.
EARL J. STEPHENSON.